(12) United States Patent
Shiozawa et al.

(10) Patent No.: US 8,335,140 B2
(45) Date of Patent: Dec. 18, 2012

(54) OPTICAL DISC DRIVE FOR RECORDING OR REPRODUCING DATA ON A MULTILAYER OPTICAL DISC WITH A LAYER IDENTIFICATION REGION

(75) Inventors: Manabu Shiozawa, Yokohama (JP); Takakiyo Yasukawa, Fujisawa (JP)

(73) Assignees: Hitachi-LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/179,620

(22) Filed: Jul. 11, 2011

(65) Prior Publication Data

US 2012/0033535 A1 Feb. 9, 2012

(30) Foreign Application Priority Data

Aug. 3, 2010 (JP) .................................. 2010-174546

(51) Int. Cl.
*G11B 15/04* (2006.01)
(52) U.S. Cl. ...................................... 369/53.22; 369/94
(58) Field of Classification Search .................. None
See application file for complete search history.

(56) References Cited

U.S. PATENT DOCUMENTS 6,728,195 B2 * 4/2004 Satoh et al. ................ 369/275.3
2003/0058771 A1 * 3/2003 Furukawa et al. ......... 369/59.11
2007/0189147 A1 * 8/2007 Miyamoto et al. ......... 369/275.1
2009/0316537 A1 * 12/2009 Nakatani et al. ........... 369/44.14

FOREIGN PATENT DOCUMENTS

| JP | 2002-074679 | 3/2002 |
|---|---|---|
| JP | 2002-117591 | 4/2002 |
| JP | 2002-279649 | 9/2002 |
| JP | 2005-032290 | 3/2005 |
| JP | 2006-114158 | 4/2006 |
| WO | WO 00/23990 | 4/2000 |
| WO | WO 2005/109413 A1 | 11/2005 |

* cited by examiner

*Primary Examiner* — Paul Huber
(74) *Attorney, Agent, or Firm* — Antonelli, Terry, Stout & Kraus, LLP.

(57) ABSTRACT

The present invention provides a multilayer optical disc and an optical disc drive which can identify recording layers without performing tracking servo control or changing the structure of the disc. In a multilayer optical disc 100, the recording layer includes a layer identification region 101 having a recording pattern for layer identification, the layer identification region 101 including a layer specific region 102 having a specific pattern and a common region 103 having a common pattern different from the specific pattern, the layer specific region 102 being provided at a different radial position in each of the recording layers. The optical disc drive detects the layer specific region 102 having the specific pattern from the layer identification region 101 of the multilayer optical disc 100, and identifies the current layer based on the radial position of the layer specific region.

3 Claims, 4 Drawing Sheets

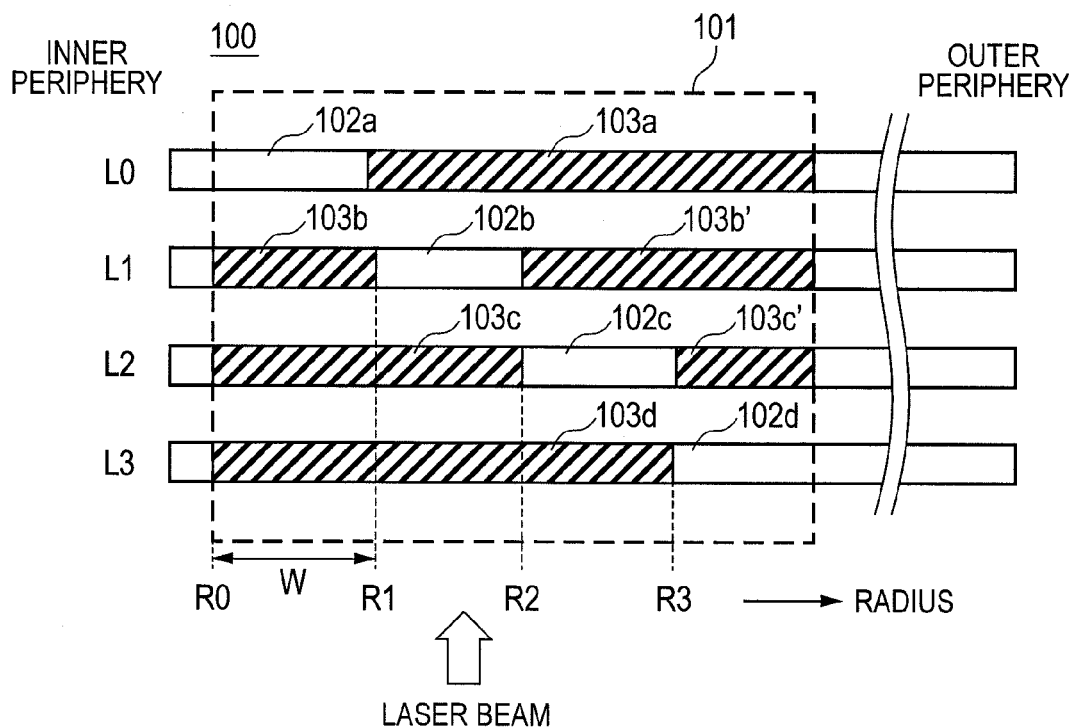

OPTICAL DISC DRIVE FOR RECORDING OR REPRODUCING DATA ON A MULTILAYER OPTICAL DISC WITH A LAYER IDENTIFICATION REGION

CLAIM OF PRIORITY

The present application claims priority from Japanese patent application serial No. JP 2010-174546, filed on Aug. 3, 2010, the content of which is hereby incorporated by reference into this application.

BACKGROUND OF THE INVENTION (1) Field of the Invention

The present invention relates to a multilayer optical disc having multiple recording layers and an optical disc drive that can easily identify the layers of the multilayer optical disc.

(2) Description of the Related Art

In recent years, BD (Blu-ray) optical discs have been developed with an increased number of recording layers to obtain larger recording capacities. Two-layer discs have been already put into practical use. Optical discs, each having three or at least four recording layers (hereinafter, will be referred to as multilayer discs), are expected to be standardized in the future to achieve further increases in capacity.

On a multilayer optical disc, a light spot has to be moved to a target recording layer (target layer) to perform focus servo control before recording/reproduction. In order to identify whether the light spot has been moved to the target layer or not, generally, address information is extracted from a reproduced signal or a wobble signal from the optical disc and is decoded to identify whether the current recording layer is the target layer or not.

In addition to a method using address information, for example, International Publication No. WO 00/23990 discloses an optical information recording medium having a management region for recording identification information about deviations in the circumferential direction between sector address portions, the management region being provided in at least one of the information layers (recording layers) of the medium. The identification information is provided in various forms or at different radial positions between the information layers to recognize the identifiers of the information layers, and an identifier pattern may include the sector address portions, a bit string used in the management region, or guide grooves formed in specific conditions in data portions.

SUMMARY OF THE INVENTION

In the case where the address information is used, for decoding of the address information, tracking servo control is performed and a tilt and a focus offset are adjusted to secure the quality of a reproduced signal and a wobble signal. In the case where the current recording layer is not identified as a target layer after decoding of the address information, the light spot has to be moved again. Thus it takes a long time to enable recording and reproduction of data.

In the method of International Publication No. WO 00/23990, an identification pattern for identifying the information layers has to be formed during the manufacturing of an optical disc, leading to a complicated and expensive structure.

The present invention provides a multilayer optical disc and an optical disc drive which can identify recording layers without performing tracking servo control or changing the structure of the disc.

The multilayer optical disc according to the present invention includes multiple recording layers, the recording layer having a layer identification region including a recording pattern for layer identification, the layer identification region including a layer specific region having a specific pattern and a common region having a common pattern different from the specific pattern, the layer specific region being provided at a different radial position in each of the recording layers.

An optical disc drive according to the present invention includes: an optical pickup that emits a laser beam to a multilayer optical disc; a stepping motor that moves the optical pickup in the radial direction of the disc; a signal processing unit that processes a reproduced signal from the multilayer optical disc; and a controller that identifies the recording layers of the multilayer optical disc and controls the operations of the overall optical disc drive. The multilayer optical disc includes, in a layer identification region, a layer specific region having a specific pattern for layer identification, and the controller detects the layer specific region having the specific pattern from the layer identification region of the multilayer optical disc and identifies the current layer based on the radial position of the specific region.

An optical disc drive according to the present invention includes: an optical pickup that emits a laser beam to the multilayer optical disc; a stepping motor that moves the optical pickup in the radial direction of the disc; a signal processing unit that processes a reproduced signal from the multilayer optical disc; and a controller that outputs a recording signal to the optical pickup and controls the operations of the overall optical disc drive. In the case where the multilayer optical disc includes a layer identification region having no recording patterns for layer identification, the controller moves the optical pickup to the layer identification region of the multilayer optical disc and records, as the recording pattern for layer identification, a specified pattern at a radial position specified for the current layer.

According to the present invention, it is not necessary to decode address information of a reproduced signal or a wobble signal and the recording layers can be identified only by identifying a recording state. Thus it is possible to identify whether a light spot has been moved to a target layer without performing tracking servo control or changing the structure of the disc, thereby shortening a time period before recording or reproduction of data.

BRIEF DESCRIPTION OF THE DRAWINGS

These and other features, objects and advantages of the present invention will become more apparent from the following description when taken in conjunction with the accompanying drawings wherein:

FIG. 1 is a cross-sectional view showing a multilayer optical disc according to an embodiment of the present invention;

FIG. 2 shows an example of the recording pattern of a layer identification region;

DETAILED DESCRIPTION OF THE EMBODIMENT

Figure 3:
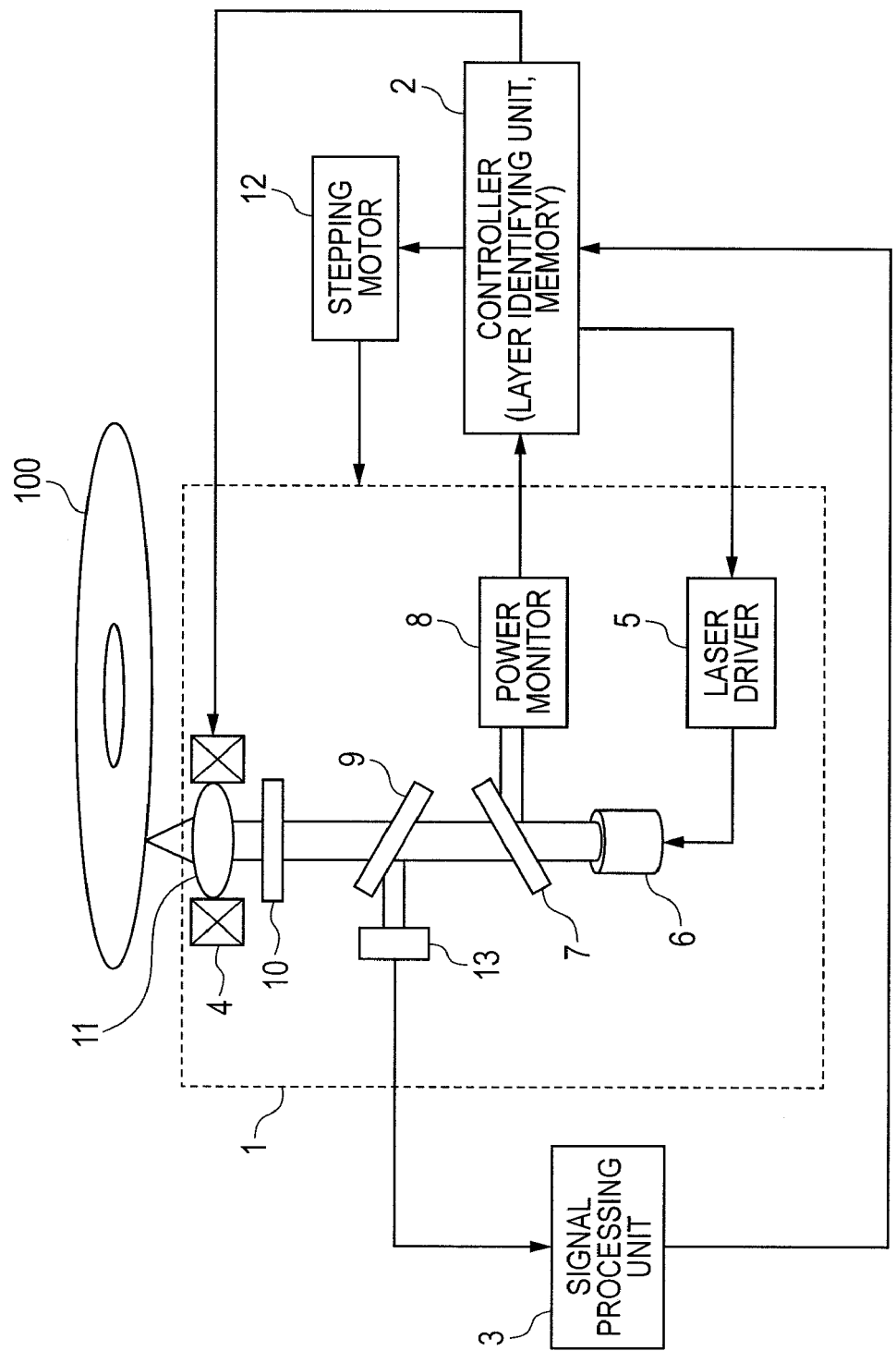
FIG. 3 is a structural diagram showing an optical disc drive according to the embodiment of the present invention.

An embodiment of the present invention will be described below in accordance with the accompanying drawings.

FIG. 1 is a sectional view showing a multilayer optical disc according to the embodiment of the present invention. In this configuration, a multilayer optical disc 100 is a recordable disc having four recording layers. The recording layers sequentially disposed in the incident direction of a laser beam will be referred to as L3, L2, L1, and L0. A management region on the inner periphery of the disc includes a layer identification region 101 indicated by a broken line. The recording layers (L3, L2, L1, and L0) are identified by the information of the region 101. The layer identification region 101 includes a layer specific region 102 (white region) located at a specific radial position in each of the recording layers and a common region 103 (hatched region) other than the layer specific region 102. For example, the recording layer L0 includes a layer specific region 102a and a common region 103a.

The layer specific region 102 and the common region 103 have predetermined recording marks formed in different recording patterns. The layer specific region 102 may not include any recording marks (unrecorded). The recording mark formed in the layer specific region 102 will be called a "specific pattern" and the recording mark formed in the common region 103 will be called a "common pattern". Furthermore, the radial positions of the layer specific region 102 (the inner end positions of the layer specific regions) are R0 in the L0 layer, R1 in the L1 layer, R2 in the L2 layer, and R3 in the L3 layer. The radial positions R0 to R3 have predetermined specific values for the respective layers. For example, R0 is 23.0 mm, R1 is 23.1 mm, R2 is 23.2 mm, and R3 is 23.33 mm. In this case, the layer specific region 102 has a width W of 100 μm. The width W of the layer specific region 102 is desirably increased to improve the accuracy of layer identification but the overall layer identification region may be reduced with the width W of several tracks to prevent a reduction of a user data region.

In layer identification, the layer identification region 101 is reproduced and the position of the layer specific region 102 is detected, from which a specific pattern is detected. At this point, the layer specific region 102 and the common region 103 can be easily distinguished from each other because reproduced signals have different patterns. Further, the current recording layer is identified as one of L0 to L3 depending upon which one of R0 to R3 corresponds to the detected radial position of the layer specific region 102.

FIG. 1 shows an example in which the radial positions R0 to R3 of the layer specific regions 102 of the recording layers L0 to L3 are sequentially shifted to the outer periphery. The present invention is not limited to this configuration as long as the radial positions R0 to R3 are located at different positions. FIG. 1 shows a four-layer disc. Other kinds of multilayer discs may be similarly configured. The recording mark may be placed by an optical disc drive loaded with the optical disc or a disc manufacturer during the manufacturing of the disc. According to the optical disc of the present embodiment, the recording mark including the specific pattern is formed and the layer is identified depending on the detected position of the specific pattern. Thus unlike in, for example, formation of bits, the structure of the disc is not changed.

FIG. 2 shows an example of the recording pattern of the layer identification region 101.

As described above, the layer identification region 101 includes the layer specific region 102 and the common region 103 in which different recording patterns (a specific pattern and a common pattern) are formed to identify the regions. In Example 1, the layer specific region 102 (specific pattern) is placed in an unrecorded state and has no recording marks and the common region 103 (common pattern) has a random pattern or an 8T repeating pattern. In the case where the specific pattern is unrecorded, the common pattern is recorded to distinguish between the regions. Thus the common pattern can have any code. Conversely, the specific pattern may be recorded and the common pattern may be unrecorded. In this case, the common region is placed in an unrecorded state as in a new disc and thus it is necessary to search for the layer specific region to distinguish the common region from that of a new disc. In the case where the layer specific region of several tracks is quite smaller than the common region, the search may require a long time. Thus it is desirable to easily distinguish the common region in an unrecorded state from the common region of a new disc.

In Example 2, the specific pattern is a 2T repeating pattern and the common pattern is a random pattern, whereas in Example 3, the specific pattern is a random pattern and the common pattern is a 2T repeating pattern. In Example 2 and Example 3, the 2T repeating pattern and the random pattern have different reflection levels and reproduced signal envelopes. In this manner, the regions can be identified by allocating a special pattern to one of the regions. The special pattern may not be a 2T repeating pattern. For example, the special pattern may be a 3T or 4T repeating pattern as long as the 3T or 4T repeating pattern and the random pattern have different reflection levels and envelopes.

FIG. 3 is a structural diagram showing an optical disc drive according to the embodiment of the present invention.

The optical disc drive includes: an optical pickup 1 that emits a laser beam to the loaded multilayer optical disc 100; a stepping motor 12 that moves the optical pickup 1 in the radial direction of the disc; a signal processing unit 3 that processes, for example, a reproduced signal from the optical disc 100; and a controller 2 that contains a microcomputer for controlling the operations of the overall optical disc drive. The optical disc drive identifies the layers of the multilayer optical disc 100 and records and reproduces data in the target recording layer. Moreover, identification recording patterns are formed in the layer identification region to identify the layers of the multilayer optical disc 100. The following will describe the identification of the layers of the multilayer optical disc 100 and the formation of the identification recording patterns. The explanation of data recording/reproduction is omitted.

In the optical pickup 1, a laser driver 5 controlled by the controller 2 supplies current to a laser diode 6. The laser diode 6 emits a laser beam according to the supplied current. A power monitor 8 detects the radiant power of the laser beam outputted from the laser diode 6 through a beam splitter 7, converts the detected power to a voltage value, and outputs the voltage value to the controller 2. The laser beam transmitted through the beam splitter 7 passes through a polarization beam splitter 9, and then the laser beam is phase-shifted by a quarter wavelength and the polarization direction is changed by a quarter wavelength plate 10. An objective lens 11 is position controlled (in the thickness direction of the disc) by an actuator 4 and focuses the laser beam at a predetermined position (recording layer) of the optical disc 100. Furthermore, the stepping motor 12 is driven in response to a command from the controller 2, so that the optical pickup 1 is moved in the radial direction of the disc.

The laser beam reflected on the optical disc 100 contains information from the optical disc 100 as light intensity variations. The laser beam in the polarization direction having been changed by the quarter wavelength plate 10 is reflected on the polarization beam splitter 9 and is focused on a detector 13. The detector 13 outputs a signal to the signal processing unit 3 according to the intensity of the focused laser beam.

The signal processing unit 3 performs processing such as operations, equalization, and amplification on the signal inputted from the detector 13 and outputs a reproduced signal and a focusing error signal to the controller 2.

The controller 2 drives the actuator 4 in response to the focusing error signal and controls the actuator 4 so as to focus the laser beam onto the target recording layer of the optical disc 100. Thus the controller 2 includes a layer identifying unit for the multilayer optical disc to identify the position of the current layer based on the pattern of the reproduced signal and the detected position. For layer identification, information (the radial positions of the layer specific regions) for identifying the recording layers is stored in memory. In this example, the controller 2 and the signal processing unit 3 are separately provided. The controller 2 and the signal processing unit 3 may be integrated into a single unit.

The following will describe the case where layer identification patterns are recorded in the layer identification region 101 of the multilayer optical disc 100 by the optical disc drive. The controller 2 reads recording patterns (specific pattern and common pattern) determined for layer identification and the radial positions of the recording patterns from the memory, and then the controller 2 drives the stepping motor 12 to move the optical pickup 1 to the specified radial position of each recording layer. After that, the controller 2 outputs a recording signal corresponding to the specified pattern to the laser driver 5. The laser driver 5 supplies driving current to the laser diode 6 in response to the recording signal, and the laser diode 6 outputs a laser beam with an emission waveform corresponding to the driving current. The laser beam is focused on the optical disc 100 through the objective lens 11 and the specified layer identification pattern is recorded. The current for driving the laser diode 6 may be outputted by the controller 2.

Figure 4:
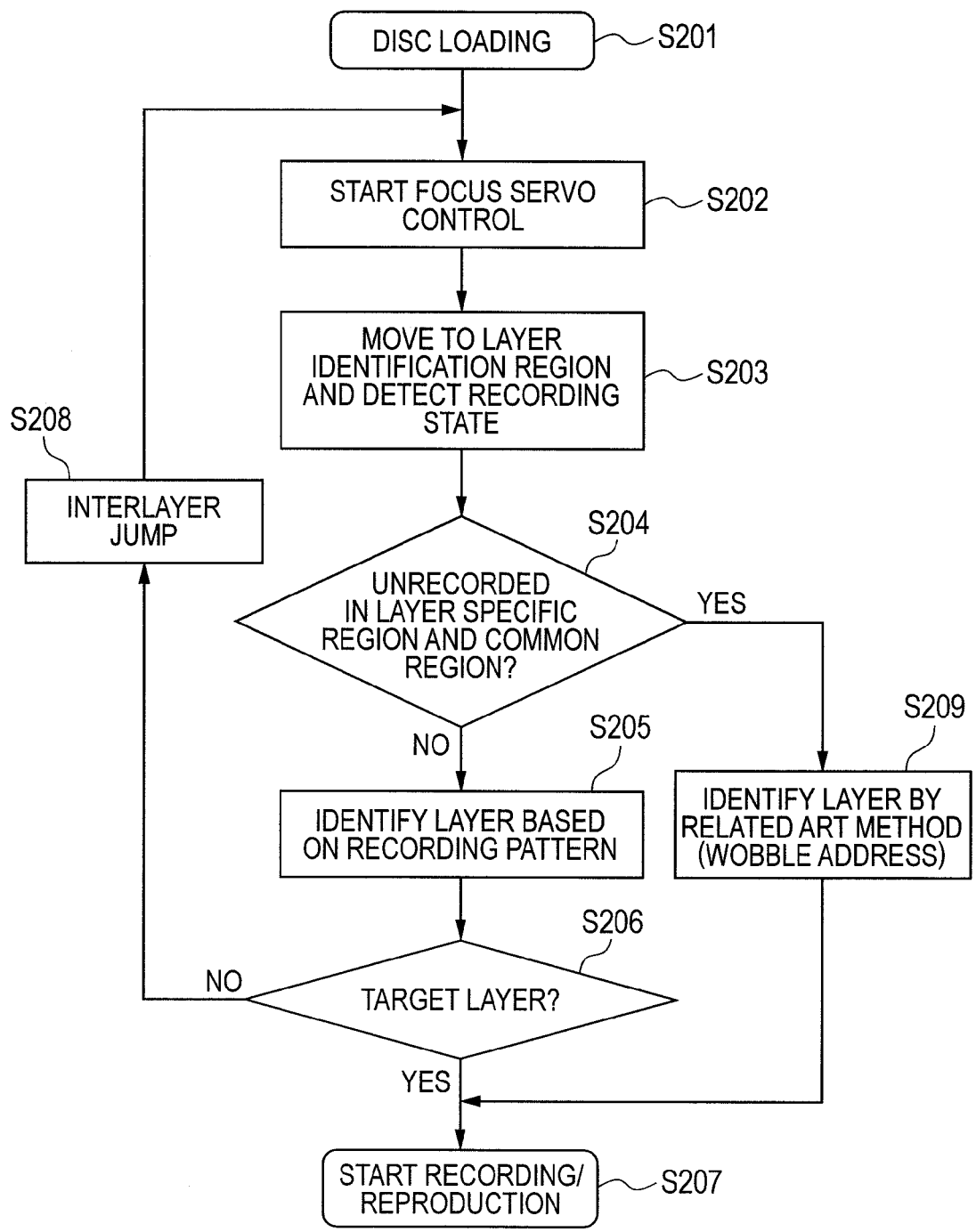
FIG. 4 shows an example of a flowchart from the identification of a recording layer of the multilayer optical disc to the start of recording/reproduction.

FIG. 4 shows an example of a flowchart from the identification of the recording layer of the multilayer optical disc to the start of recording/reproduction.

In S201, the multilayer optical disc to be recorded or reproduced is loaded in the optical disc drive and is rotated at a predetermined speed. The optical disc includes the layer identification region 101 of FIG. 1. The recording layers each include the layer specific region 102 (specific pattern) at a specific radial position and the common region 103 (common pattern) other than the layer specific region 102.

In S202, the actuator 4 is driven to focus a laser beam to the target recording layer and focus servo control is started.

In S203, the optical pickup 1 is moved to the layer identification region 101 in the optical disc and the region is reproduced to detect a recording state (recording pattern) at each radial position.

In S204, it is decided that whether the layer specific region 102 and the common region 103 are both unrecorded in the layer identification region 101. As a result of the decision, in the case where the regions are both unrecorded (Yes in S204), the layer identification method of the present embodiment is not applicable to the disc (for example, a new disc). In this case, the process advances to S209 and the layer is identified by a related art method of, for example, the wobble address format. As a result of the decision, in the case where at least one of the regions is recorded (No in S204), the process advances to S205.

In S205, the layer specific region 102 having a recorded specific pattern is detected based on recording patterns in the layer identification region 101. Then, the radial position of the detected layer specific region 102 is compared with the radial positions of the recording layers in the memory to identify the current layer. The radial position can be calculated by an amount of driving of the stepping motor 12 relative to, for example, the innermost periphery of the disc.

In S206, it is decided whether the current recording layer is the target recording layer or not. In the case where the current recording layer is the target recording layer (Yes in S206), the process advances to S207 and the laser beam is moved to a target address in the current layer to start recording/reproduction. In the case where the current recording layer is not the target recording layer (No in S206), the process advances to S208, a focus servo is temporarily removed, and an interlayer jump is made to move the focal position of the laser beam to the target recording layer. After that, the process returns to S202 to perform focus servo control again, processing in and after S203 is repeated to identify the current recording layer, and then the target recording layer is accessed.

As described above, the method of the present embodiment makes it possible to identify the recording layers without using tracking servo control or a wobble signal, thereby shortening the access time.

Figure 5:
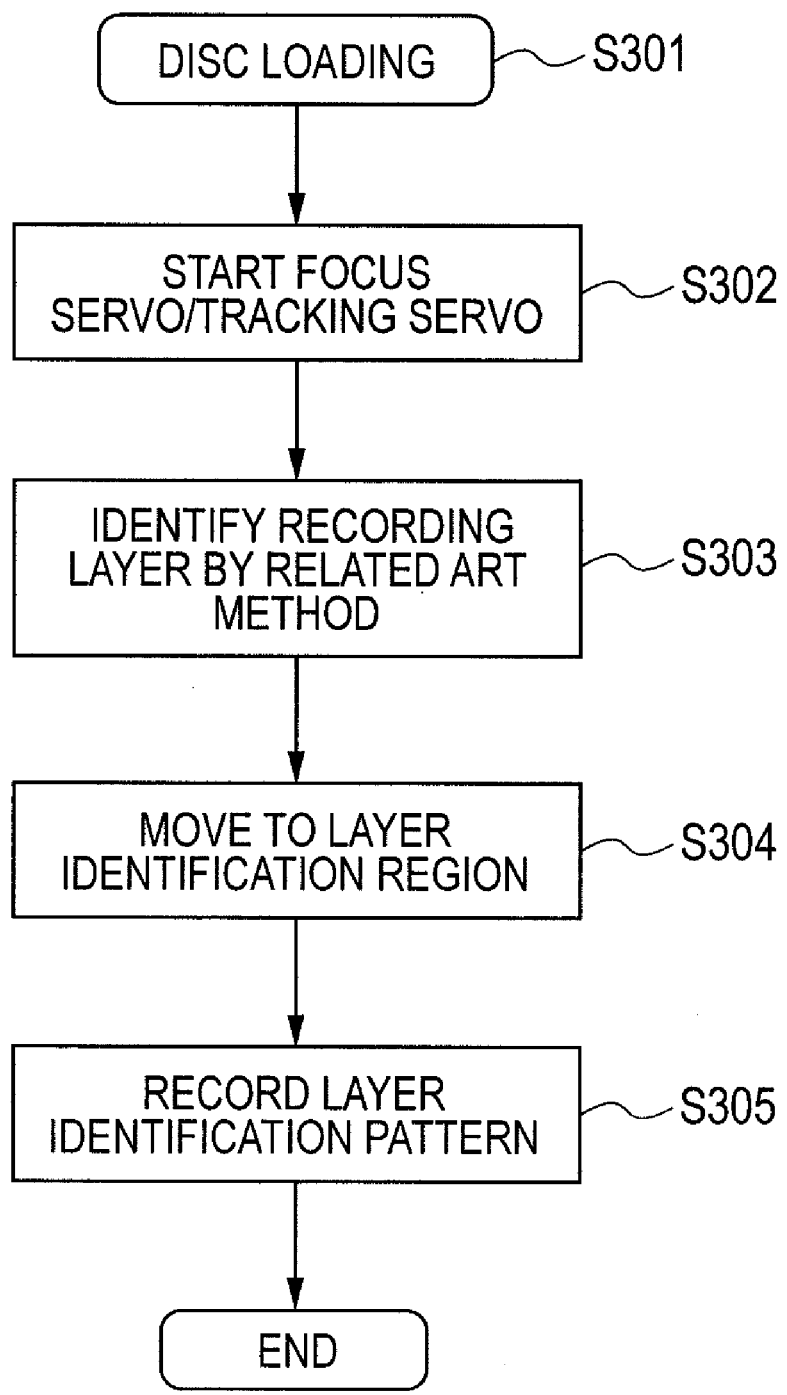
FIG. 5 shows an example of a flowchart of forming recording patterns in the layer identification region of the multilayer optical disc.

FIG. 5 shows an example of a flowchart of forming recording patterns in the layer identification region of the multilayer optical disc. In this example, recording marks for layer identification are formed in the multilayer optical disc by the optical disc drive.

In S301, the multilayer optical disc is loaded in the optical disc drive and is rotated at a predetermined speed.

In S302, focus servo control and tracking servo control are started.

In S303, the current recording layer having a focused laser beam is identified. The layer can be identified by decoding a wobble signal formed on the disc or an address recorded in a reproduced signal, according to a related art method.

In S304, the optical pickup 1 is moved to the layer identification region 101 in the optical disc. Preferably, the layer identification region 101 is, for example, an OPC (Optimum Power Control) region or any other regions. Moreover, the radial position of the layer specific region 102 is read from the memory, the radial position being specified for the current layer.

In S305, a layer identification pattern is recorded. Specifically, a specific pattern is recorded at the radial position of the layer specific region 102 and a common pattern is recorded in the other common region 103. The specific pattern and the common pattern are selected from, for example, combinations shown in FIG. 2.

The layer identification pattern may be formed in each of the recording layers after the disc is loaded, or the layer identification pattern may be formed only in the specified recording layer after the recording layer is accessed and data is recorded or reproduced in the recording layer. Alternatively, the layer identification pattern may be formed after OPC. In this case, the recording conditions are optimized and thus facilitate the pattern formation.

According to this method, information enabling layer identification can be written on a new multilayer optical disc without changing the structure of the disc. The layer identification information written thus facilitates the identification of the recording layer in the subsequent recording or reproduction.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An optical disc drive configured to emit a laser beam to record or reproduce data on a multilayer optical disc, the multilayer optical disc having a plurality of recording layers, the optical disc drive comprising:
- an optical pickup configured to emit the laser beam to the multilayer optical disc.
- a stepping motor configured to move the optical pickup in a radial direction of the disc;
- a signal processing unit configured to process a reproduced signal from the multilayer optical disc; and
- a controller configured to identify the recording layers of the multilayer optical disc and configured to control operations of the overall optical disc drive;
- wherein the multilayer optical disc includes, in a layer identification region, a layer specific region having a specific pattern for layer identification;
- wherein when the recording layer of the multilayer optical disc is identified, the controller is configured to cause the optical pickup to start focus servo control on the current recording layer;
- wherein the controller is configured to cause the stepping motor to move the optical pickup to the layer identification region and is configured to detect the layer specific region having the specific pattern from the layer identification region without tracking servo control;
- wherein the controller is configured to identify a current layer based on a radial position of the layer specific region.

2. An optical disc drive configured to emit a laser beam to record or reproduce data on a multilayer optical disc, the multilayer optical disk having a plurality of recording layers, the recording layers including layer identification information, the optical disc drive comprising:
- an optical pickup configured to emit the laser beam to the multilayer optical disc;
- a stepping motor configured to move the optical pickup in a radial direction of the disc;
- a signal processing unit configured to process a reproduced signal from the multilayer optical disc; and
- a controller configured to output a recording signal to the optical pickup and configured to control operations of the overall optical disc drive,
- wherein when the multilayer optical disc includes a layer identification region having no recording patterns for layer identification, the controller is configured to move the optical pickup to the layer identification region of the multilayer optical disc and to record a specified pattern in an unrecorded region in the layer identification region of a current recording layer, such that the specified pattern for the current recording layer is located at a radial position different than radial positions of specified patterns of other recording layers; and
- wherein in the layer identification region, a width of the unrecorded region is smaller than a width of a recorded region.

3. The optical disc drive of claim 2,
- wherein the specified pattern for each recording layer is located at a radial position different than radial positions specified for every other recording layer.

* * * * *